United States Patent [19]

Nishide et al.

[11] Patent Number: 5,309,356
[45] Date of Patent: May 3, 1994

[54] THREE-DIMENSIONAL REPROJECTED IMAGE FORMING APPARATUS

[75] Inventors: Akihiko Nishide, Tokyo; Kazushige Takahashi, Yokohama, both of Japan

[73] Assignee: Kabushiki Kaisha Toshiba, Kawasaki, Japan

[21] Appl. No.: 502,916

[22] Filed: Apr. 2, 1990

Related U.S. Application Data

[63] Continuation-in-part of Ser. No. 250,156, Sep. 28, 1988, abandoned.

[30] Foreign Application Priority Data

Sep. 29, 1987 [JP] Japan .................. 62-245417
Sep. 30, 1987 [JP] Japan .................. 62-245995

[51] Int. Cl.⁵ .................................. G06F 15/42
[52] U.S. Cl. .................. 364/413.19; 364/413.14; 364/413.13; 364/413.09; 364/413.22
[58] Field of Search ............. 364/413.14, 413.19, 364/413.13, 413.09, 413.22

[56] References Cited

U.S. PATENT DOCUMENTS 4,216,526  8/1980  Karwowski ............... 364/414
4,789,929 12/1988  Nishimura et al. ......... 364/413.15
4,835,688  5/1989  Kimura .................... 364/413.22
4,858,129  8/1989  Mori ...................... 364/413.14

OTHER PUBLICATIONS

Harris L. et al, "Display and Visualization of Three-Dimensional Reconstructed Anatomic Morphology: Experience with Thorax, Heart and Coronary Vasculature of Dogs", Journal of Computer Assisted Tomography, vol. 3 No. 4 1979 pp. 439-446.

Primary Examiner—Roy N. Envall, Jr.
Assistant Examiner—Gita Shingala
Attorney, Agent, or Firm—Oblon, Spivak, McClelland, Maier & Neustadt

[57] ABSTRACT

Continuous tomographic image data obtained by a tomographic image forming unit such as an X-ray CT scanner is stored in a two-dimensional image memory under the control of a control computer. A two-dimensional space filtering processor, a two-dimensional affine transformation processor and a two-dimensional image addition processor are connected to the control computer and execute two-dimensional affine transformation, two-dimensional image addition and two dimensional space filtering of the tomographic image data, so that a pseudo three-dimensional reprojected image is obtained.

4 Claims, 11 Drawing Sheets

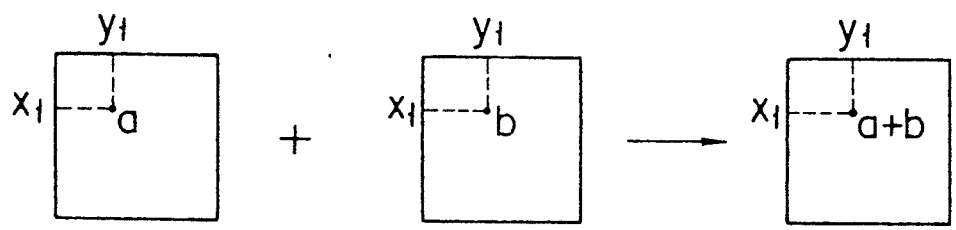
F I G. 3D
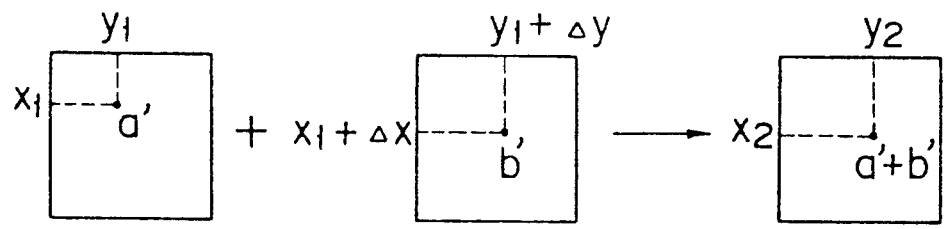
F I G. 3E

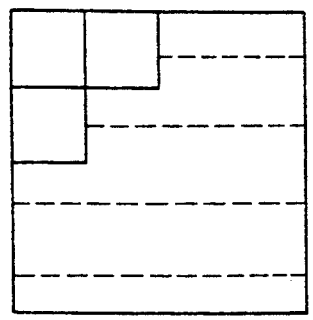
F I G. 6A
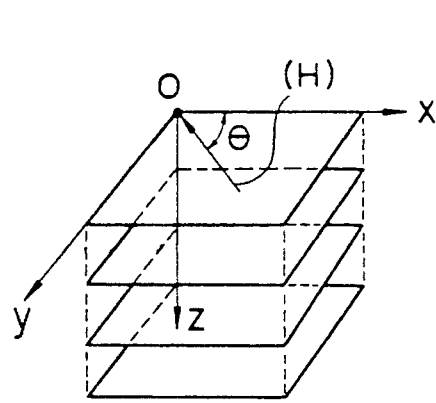
F I G. 6B
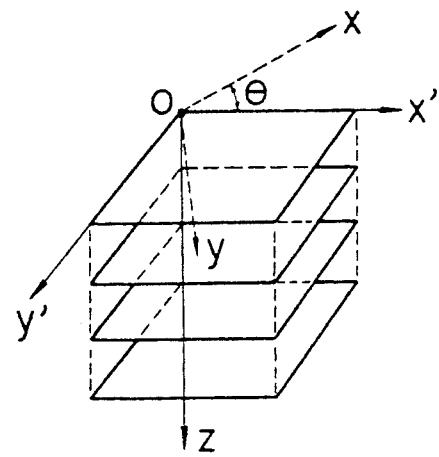
F I G. 6C
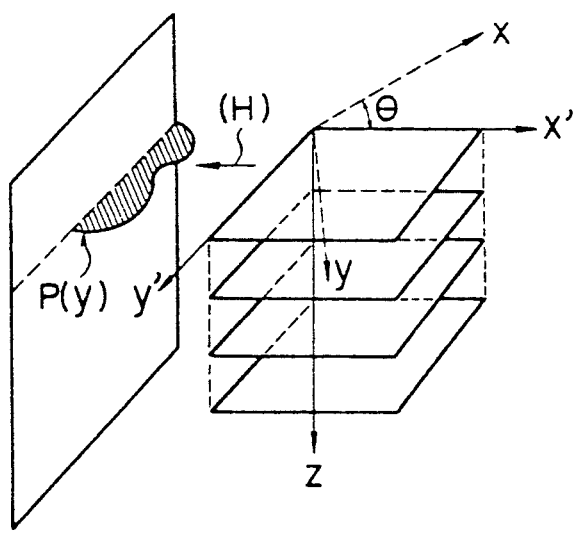
F I G. 6D
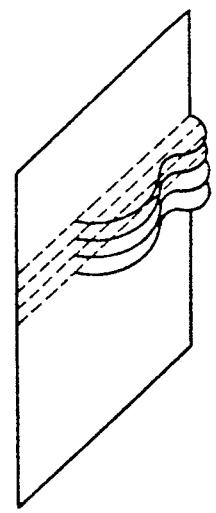
F I G. 6E

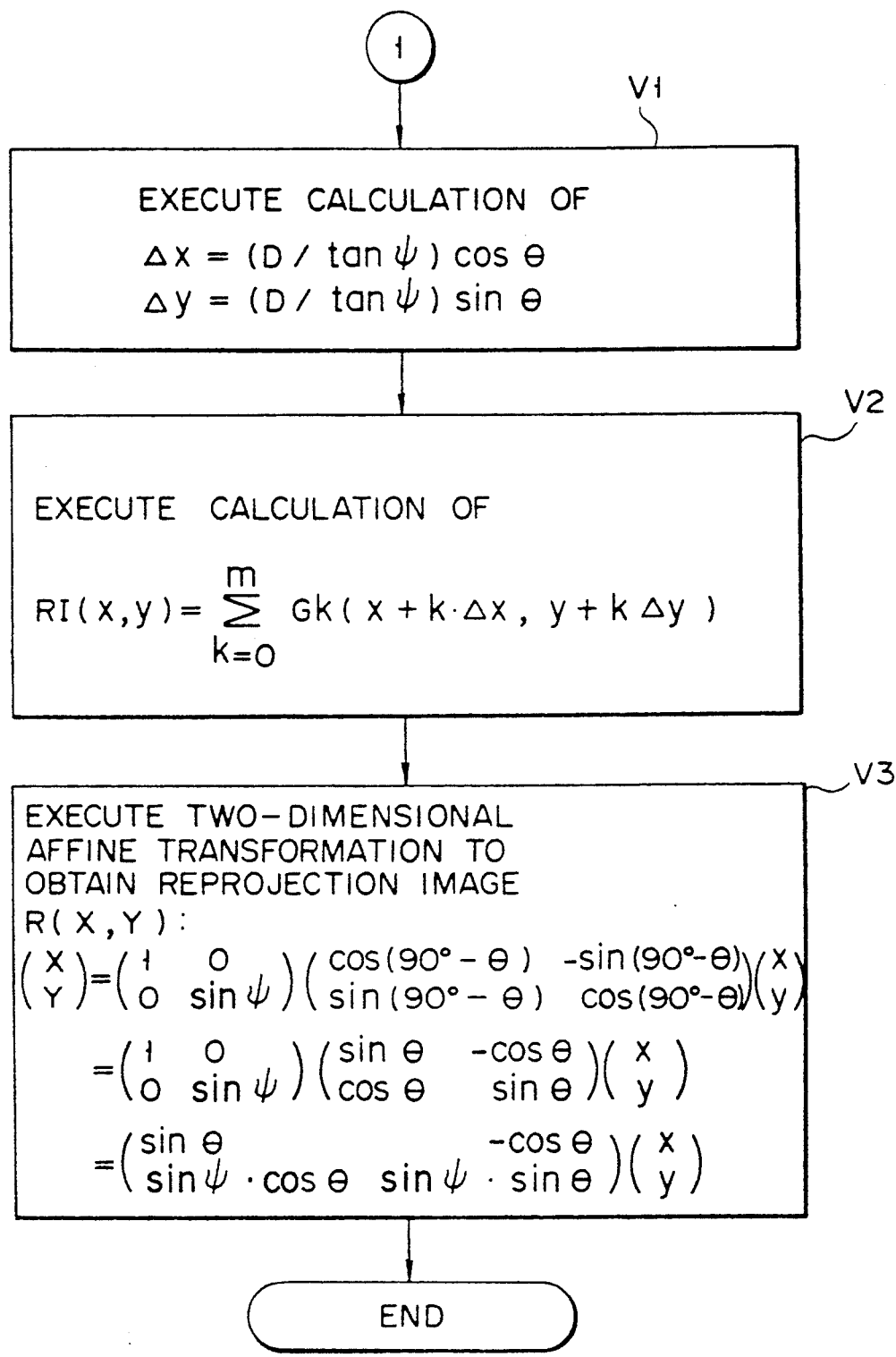
F I G. 8

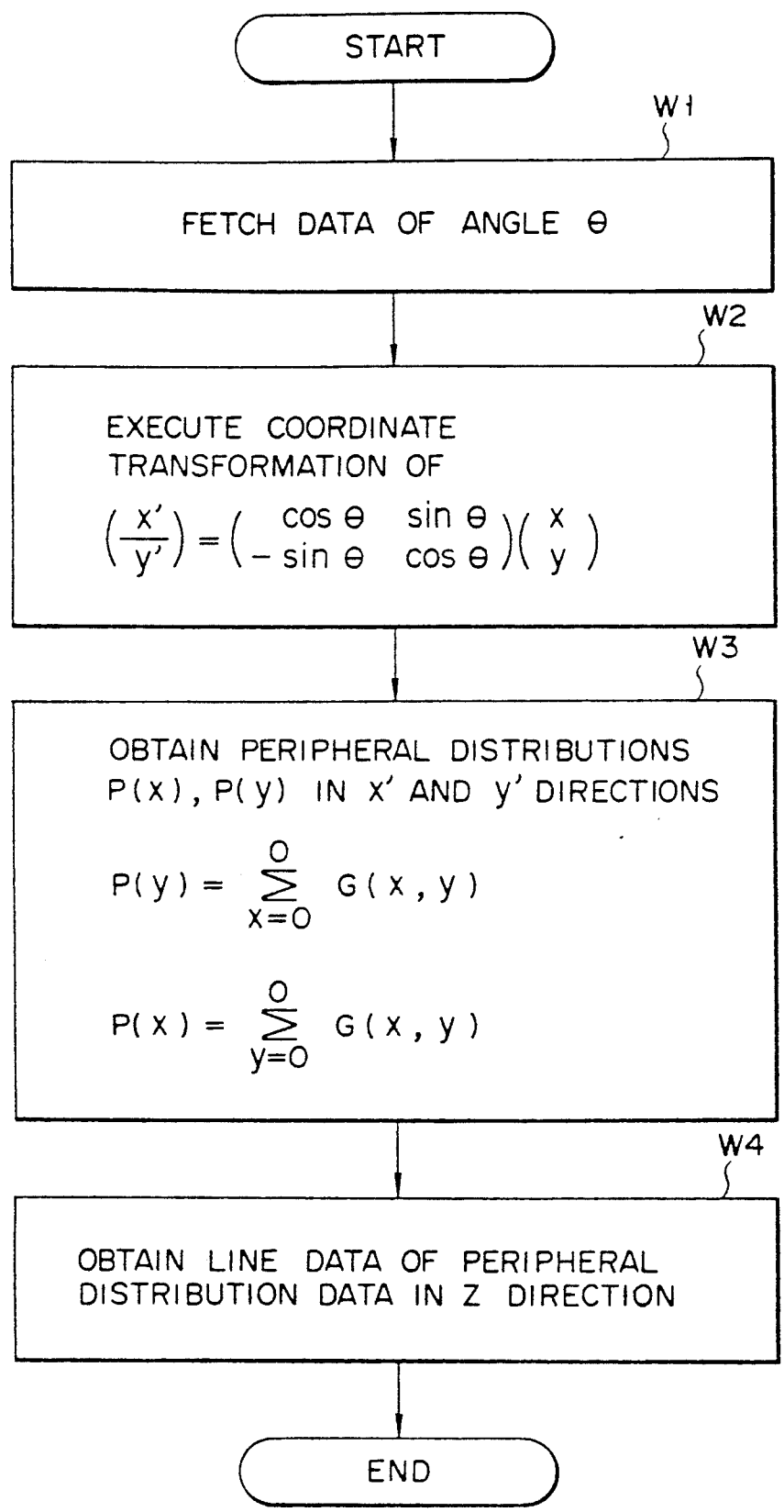
F I G. 9

5,309,356

THREE-DIMENSIONAL REPROJECTED IMAGE FORMING APPARATUS

CROSS-REFERENCE TO THE RELATED APPLICATIONS

This application is a continuation-in-part of application Ser. No. 250,156, filed on Sep. 28, 1988, now abandoned.

BACKGROUND OF THE INVENTION

1. Field of the Invention

The present invention relates to a reprojected image forming apparatus for forming a three-dimensional reprojected image from continuous two-dimensional tomographic images of, e.g., a material or a product obtained by a tomographic image forming apparatus such as an X-ray CT scanner, an NMR-CT system which utilizes a nuclear magnetic resonance phenomenon, and an ultrasonic tomographic apparatus and, more particularly, to a projected image forming apparatus for forming a pseudo three-dimensional reprojected image using a two-dimensional image processing means.

2. Description of the Related Art

Continuous tomographic images of a human body or an industrial product can be formed by a tomographic image forming apparatus such as an X-ray CT scanner, an NMR-CT system, and an ultrasonic tomographic apparatus. However, in order to three-dimensionally display these two-dimensional tomographic images (slice images), three-dimensional image processing must be performed.

Conventionally, in order to perform the three-dimensional image processing, continuous tomographic image data obtained by a tomographic image forming apparatus is stored in a magnetic disk apparatus which is an external memory apparatus. Then, a general computer sequentially reads out the tomographic image data from the magnetic disk apparatus and performs the three-dimensional image processing. A formed reprojected image is stored in the magnetic disk apparatus again.

However, the continuous tomographic images formed by the tomographic image forming apparatus require an enormous memory capacity, and the processing is performed using the general computer while the continuous tomographic images are sequentially read out from the magnetic disk apparatus. Therefore, even if the computer has a high processing speed, the three-dimensional processing requires a considerably long time period. In addition, since the general computer is used, the overall system cannot be made compact.

SUMMARY OF THE INVENTION

The present invention has been made in consideration of the above situation and has as its object to provide a projected image forming apparatus which can macroscopically form a pseudo three-dimensional reprojected image at high speed using a two-dimensional image processing means.

It is another object of the present invention to provide a projected image forming apparatus which can form a three-dimensional reprojected image, which is very easy to see, at high speed using a two-dimensional image processing means.

According to an aspect of the present invention, there is provided a projected image forming apparatus comprising:

tomographic image forming unit for forming continuous tomographic image data;

two-dimensional image memory means for storing the continuous tomographic image data formed by the tomographic image forming unit;

two-dimensional image adding means for adding the continuous tomographic image data in an image reprojection direction while offsetting the tomographic images stored in the two-dimensional image memory means;

two-dimensional space filtering means for performing space filtering of space between the continuous tomographic image data added by the two-dimensional image adding means to interpolate the spaces; and two-dimensional affine transforming means for performing two-dimensional affine transformation of an interpolated image obtained in the two-dimensional space filtering means to obtain a reprojected image.

Therefore, according to the present invention having the above arrangements, the continuous tomographic image data formed by the tomographic image forming unit is stored in a two-dimensional image memory means. Then, values of pixels of each tomographic image data are added by the two-dimensional image adding means either perpendicularly with respect to a slice plane or while the positions of the images are offset in accordance with a reprojecting direction (viewing angle direction). Spaces between the continuous tomographic image data added by the two-dimensional image adding means are interpolated by two-dimensional space filtering means. When the positions of the pixels are offset, affine transformation is performed to form a reprojected image. Thereafter, the formed reprojected image is output and displayed using the reprojected image output means.

BRIEF DESCRIPTION OF THE DRAWINGS

FIGS. 3A to 3I are views for explaining the operation of the embodiment shown in FIG. 1;

FIGS. 6A to 6E are views for explaining the operation of the embodiment shown in FIG. 4; and FIGS. 7 to 9 are flow charts for explaining operations of the first and second embodiments shown in FIGS. 1 and 4.

DETAILED DESCRIPTION OF THE PREFERRED EMBODIMENT

Figure 1:
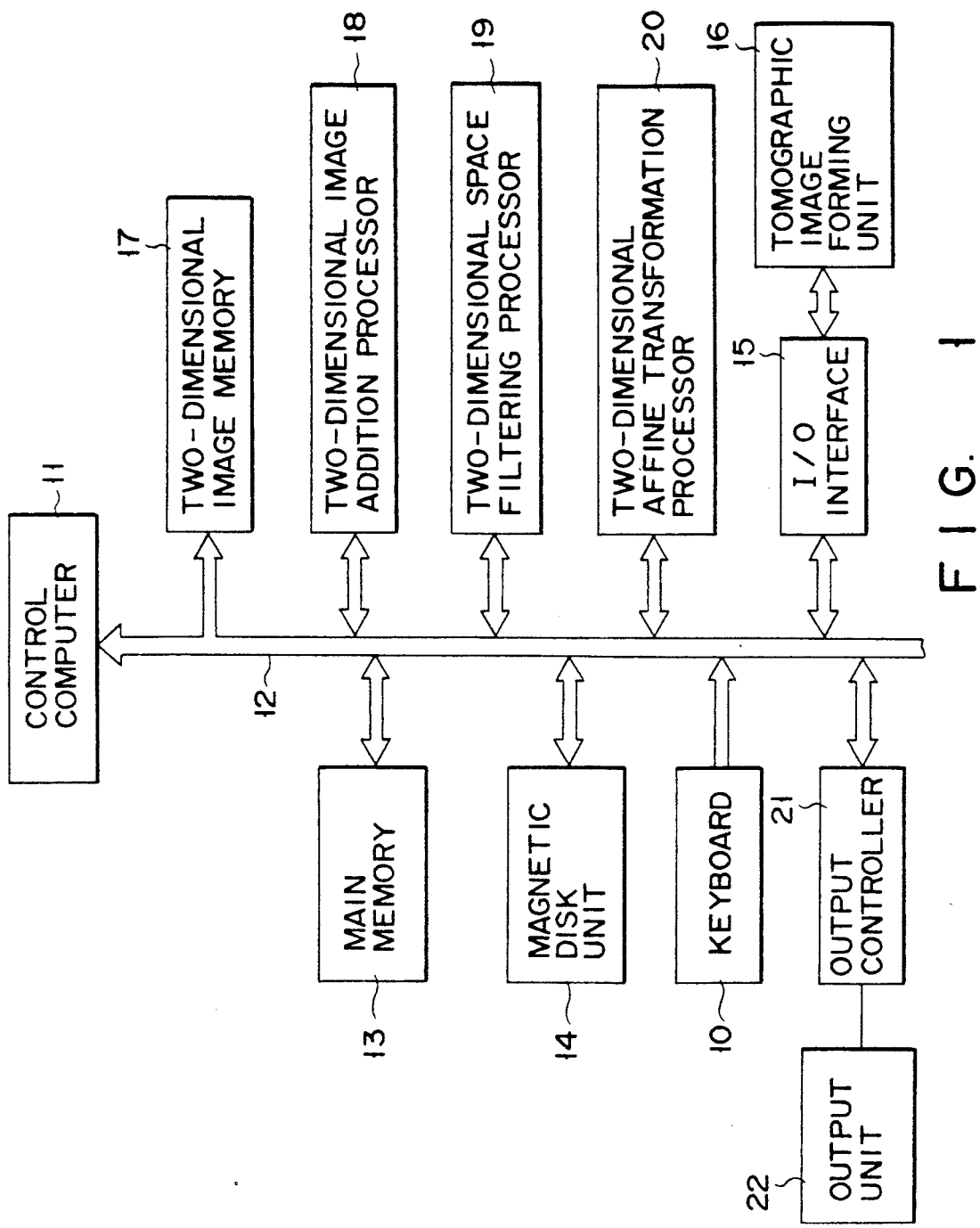
FIG. 1 is a block diagram showing an arrangement of a system according to an embodiment of the present invention.

An embodiment of the present invention will be described in detail below with reference to the accompanying drawings. FIG. 1 is a block diagram showing an arrangement of a system according to an embodiment of the present invention. In FIG. 1, reference numeral 10 denotes a keyboard for inputting various parameters to be described layer. Reference numeral 11 denotes a control computer for executing necessary processing in accordance with programs. Bus line 12, having a multibus arrangement, for address data, control data and the like, extends from computer 11. Line 12 is connected to main memory 13 and magnetic disk unit 14. Memory 13 stores necessary information in accordance with address designation of computer 11. Unit 14 stores programs constituting an operating system of computer 11, a reprojecting display control program, and other application programs.

Line 12 is also connected to tomographic image forming unit 16 such as an X-ray CT scanner through I/O interface 15. Unit 16 forms continuous tomographic images (slice images) of an object to be examined at slice pitch D input from keyboard 10 and outputs the images to bus line 12 through interface 15. In addition to the X-ray CT scanner, various apparatuses having a similar function such as an NMR-CT and an ultrasonic tomographic apparatus may be used as unit 16.

Line 12 is further connected to two-dimensional image memory 17, two-dimensional image addition processor 18, two-dimensional space filtering processor 19 and two-dimensional affine transformation processor 20. Processors 18, 19 and 20 incorporate microcomputers, respectively. Memory 17 constitutes a two-dimensional image memory means including computer 11, magnetic disk unit 14, interface 15, and tomographic image forming unit 16. When computer 11 executes a predetermined program, memory 17 stores continuous tomographic images supplied from tomographic image forming unit 16 to line 12 through interface 15 in a predetermined order and buffers image data processed by processor 18 to 20. Two-dimensional image addition processor 18 constitutes a two-dimensional image adding means including program processing of computer 11. Tomographic images stored in memory 17 are added in accordance with a reprojecting direction (viewing angle direction) represented by angles $\theta$ and $\phi$ input from keyboard 10. If the direction is perpendicular to the slice plane, the tomographic images are added without offsetting their positions. If the direction is not perpendicular, the tomographic images are added while offsetting their positions by increments $\Delta x$ and $\Delta y$ according to the reprojecting direction. After the tomographic images are added in the two-dimensional image addition processor 18, spaces between slice images are interpolated by two-dimensional space filtering processor 19. When the reprojecting direction is not perpendicular, two-dimensional affine transformation processor 20 rotates the added images and compresses them with a predetermined magnification, thereby forming a reprojected image. Functions of processors 18 to 20 will be described later with reference to a flow chart. Output unit 22 such as a CRT is connected to line 12 through output controller 21, thereby visually outputting a pseudo three-dimensional reprojected image.

An operation of the apparatus having the above arrangement will be described below with reference to FIGS. 2 to 3J. Computer 11 executes an operation of the two-dimensional image memory means in accordance with the program read out from magnetic disk unit 14. As shown in step S1 in FIG. 2, the two-dimensional image memory means sequentially supplies tomographic images (256×256 pixels: 256 gray levels) sequentially formed at slice pitch D by tomographic image forming unit 16 to line 12 through interface 15. Computer 11 reads and stores the tomographic images in two-dimensional image memory 17 in a predetermined order.

Figure 2:
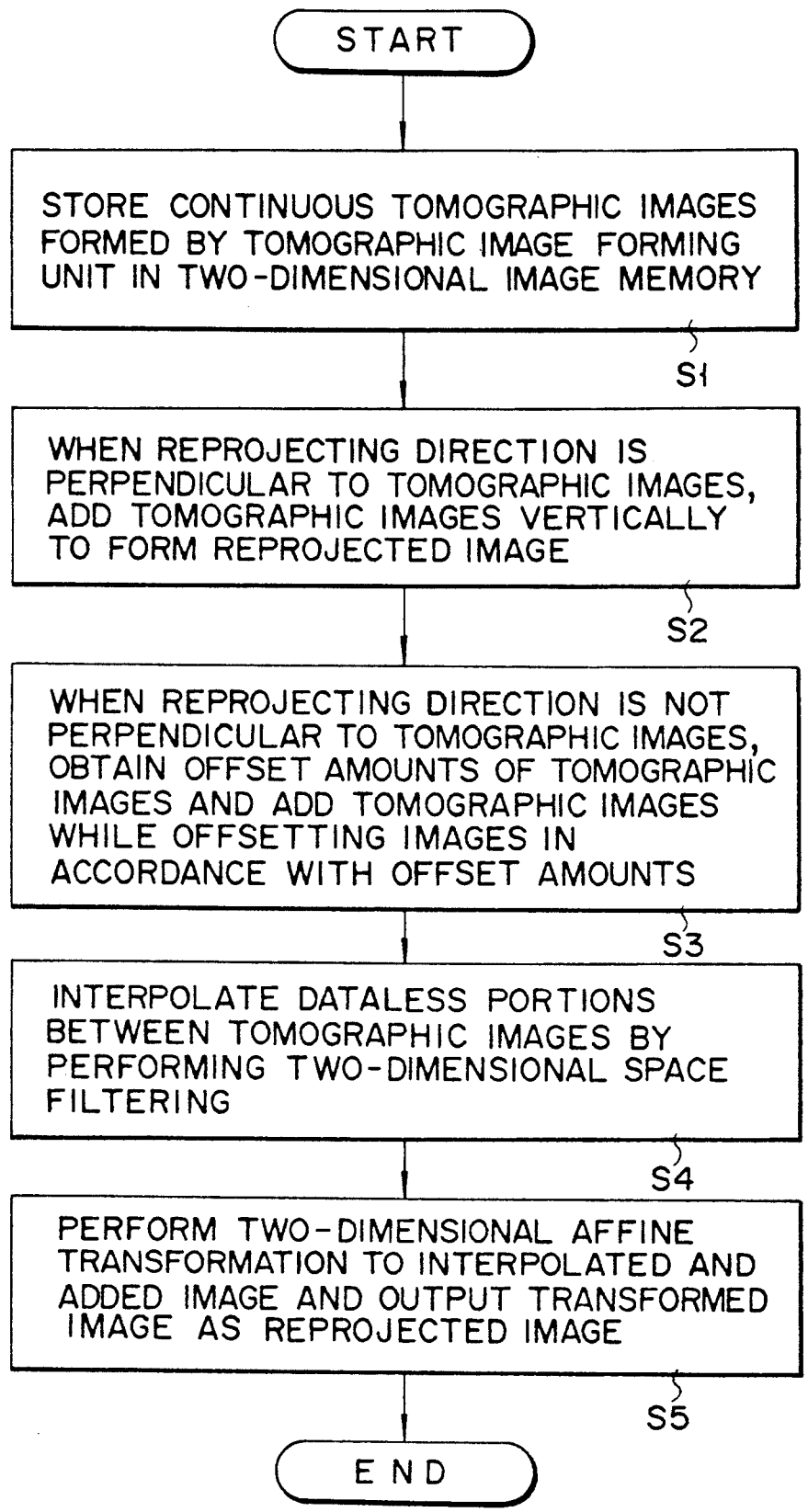
FIG. 2 is a flow chart for explaining an operation of the embodiment shown in FIG. 1.

In this manner, after 64 continuous tomographic images with a slice pitch D are stored in memory 17, an operation of the two-dimensional image adding shown in steps S2 and S3 in FIG. 2 is performed in accordance with a command based on the program supplied from computer 11. The two-dimensional image adding means adds the tomographic images in accordance with a reprojecting direction (viewing angle direction) defined by angles $\theta$ and $\phi$ input from keyboard 10, thereby forming a reprojected image.

That is, the operation of the two-dimensional image memory means depends on the reprojecting direction. The reprojecting direction may be perpendicular, oblique, or parallel with respect to tomographic images or may have an observing point. In order to perform parallel reprojection, tomographic images are directly output. In order to perform reprojection with an observing point, two-dimensional affine transformation is performed about the observing point.

An operation to be performed when a reprojecting direction is perpendicular and oblique with respect to a slice plane will be described below. Generally, in order to display continuous tomographic images n, n+1, n+2, ..., shown in FIG. 3A by reprojection, corresponding pixel values dn, dn+1, dn+2, ... of the tomographic images are integrated (added) along a reprojecting direction (viewing angle direction). In this case, pixel sum value (dn+dn+1+dn+2+...) is obtained on reprojecting surface 23.

Figure 3A:
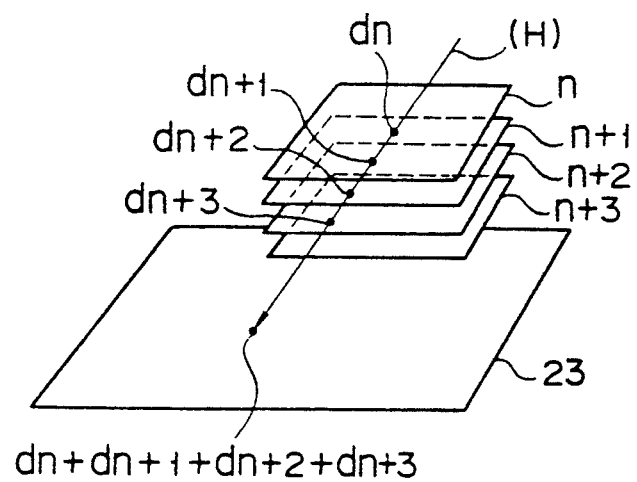
Figure 7:
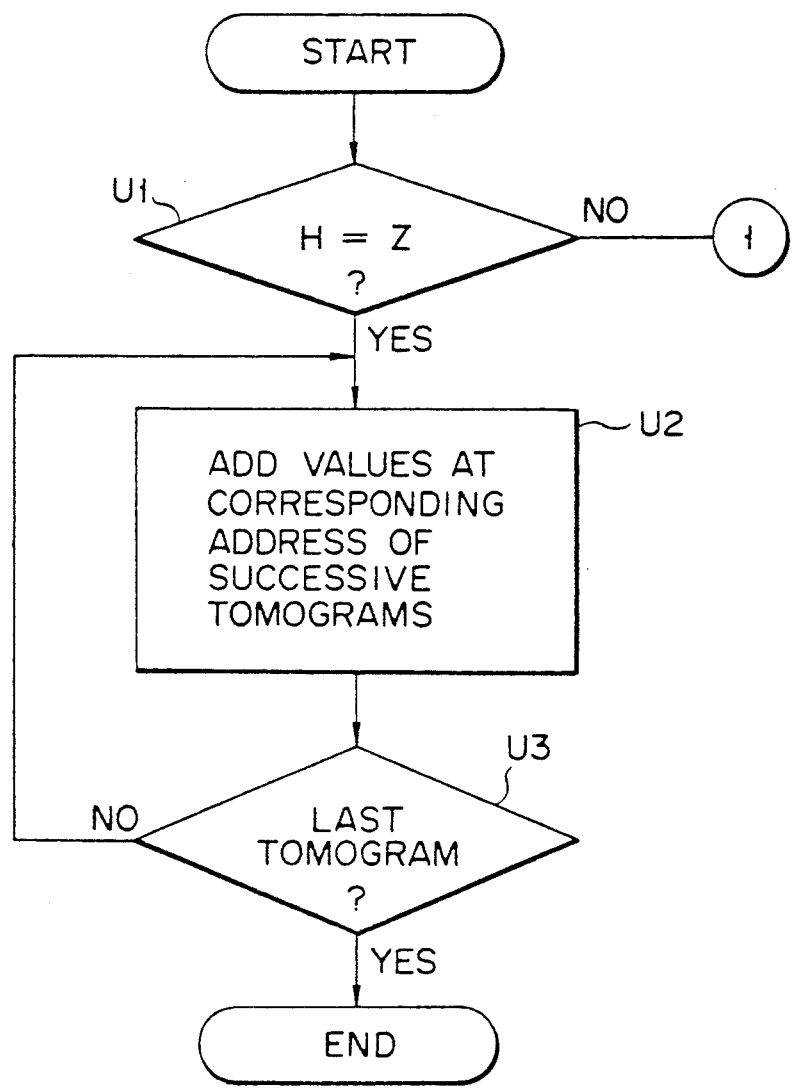

More particularly, as shown in step U1 of FIG. 7, when a reprojecting direction (H) of FIG. 3A is perpendicular to a slice plane (H=Z), all tomographic images to be reprojected are added by two-dimensional image addition processor 18 without offsetting the positions of the tomographic images perpendicularly to the slice plane as in step U2. When it is detected that the last tomogram image is added at step U3, a perpendicular reprojected image may be formed (step S2 of FIG. 2).

Figure 3B:
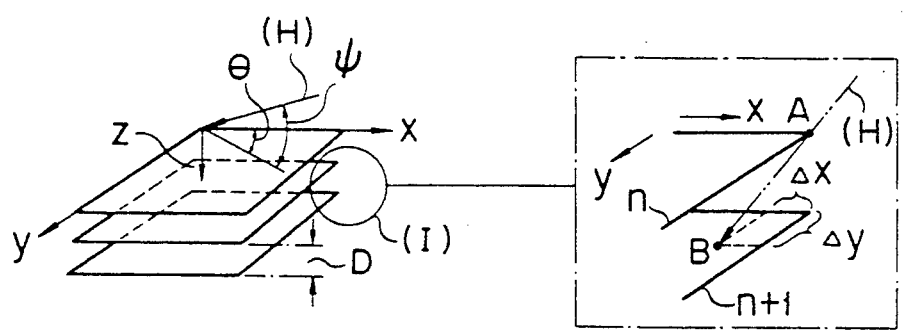
Figure 3C:
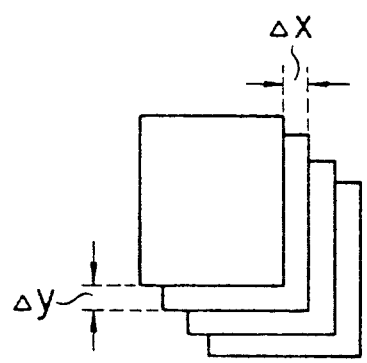

When a reprojecting direction is not perpendicular to a slice plane, all tomographic images are similarly added along the reprojecting direction by processor 18 to form a reprojected image (step S3). For example, when tomographic images have a coordinate relationship shown at the left side of FIG. 3B and are reprojected in a direction indicated by arrow H, a coordinate relationship encircled by an alternate long and dashed line at the right side of FIG. 3B is obtained in encircled portion at the left side thereof. That is, when a reprojecting direction is oblique to tomographic images n and n+1, the nth tomographic image is offset from the (n+1)th tomographic image by increments ($\Delta x$, $\Delta y$) as shown in FIG. 3B under the conditions of ($\theta \neq 0$, $\psi \neq 0$). Therefore, $\Delta x$ and $\Delta y$ are calculated in accordance with the following equations at step V1 of FIG. 8:

$$\Delta x = (D/\tan\psi)\cos\theta \qquad (1)$$

$$\Delta y = (D/\tan\psi)\sin\theta \qquad (2)$$

Then, the tomographic images to be reprojected are added while they are offset from each other by $\Delta x$ and $\Delta y$. In equations (1) and (2), D is the distance (slice pitch) between the adjacent tomographic images; $\psi$, the angle defined between the reprojecting direction and a tomographic image plane (x-y plane); and $\theta$, the angle defined between reprojection on the x-y plane in the reprojecting direction and the x-axis. In this manner, when the reprojecting direction is perpendicular, processor 18 adds corresponding pixel portions of two-dimensional images read out from memory 17 as shown in FIG. 3D. When the reprojecting direction is oblique, processor 18 adds pixel values of coordinates offset by the increments of x- and y-coordinates as shown in FIG. 3E.

When the tomographic images to be reprojected are added while they are offset by the above increments, the following equation is obtained and executed at step V2 of FIG. 8 assuming that an image obtained after addition is RI and a kth tomographic image is Gk:

$$RI(x, y) = \sum_{k=0}^{m} Gk(x + k \cdot \Delta x, y + k \cdot \Delta y) \quad (3)$$

After two-dimensional image addition processing is completed in step S3 of FIG. 2, two-dimensional space filtering processing is performed using two-dimensional space filtering processor 19 shown in FIG. 1 under the control of the control computer 11. The space filtering is performed in step S4 of FIG. 2 using two-dimensional space filtering processor 19 in which dataless portions between tomographic images are interpolated.

Figure 3F:
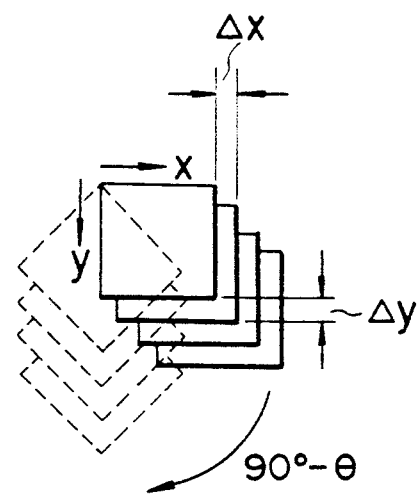

In the two-dimensional space filtering processor 19, dataless portions of an added image of the tomographic images shown by the solid lines in FIG. 3F are rotated through $(90° − \theta)$ from x-axis to y-axis direction in the x-y plane to form an image as shown by the dashed lines. According to this space filtering, a rotated image as shown in FIG. 3G is obtained. The coordinate (X, Y) is represented by the following equation (4):

$$\begin{pmatrix} X \\ Y \end{pmatrix} = \begin{pmatrix} \sin\theta & -\cos\theta \\ \cos\theta & \sin\theta \end{pmatrix} \begin{pmatrix} x \\ y \end{pmatrix} \quad (4)$$

where (x, y) represents a coordinate of a non-rotated image.

Figure 3J:
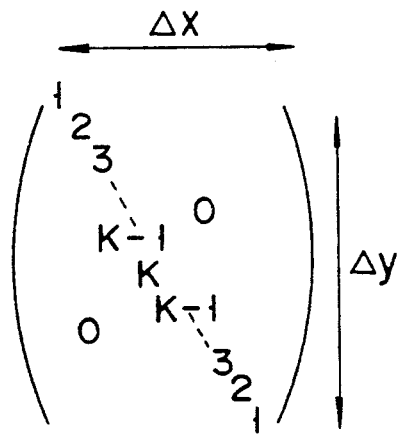
FIG. 3J is a view for explaining an operation of another space filtering.
Figure 3G:
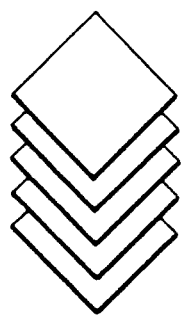
Figure 3H:
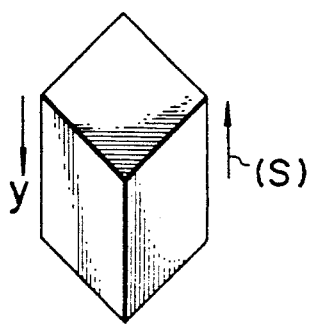

Then, the rotated coordinate (X, Y) is processed in the two-dimensional space filtering processor 19 using filtering coefficients (1, 2, 3,—k, k−1, k, −, 3, 2, 1) to form an interpolated image as shown in FIG. 3H by interpolating and adding the tomographic images, where the filtering coefficients k denote:

$$k = [\sqrt{\Delta x^2 + \Delta y^2}], \text{ and } [ ] \text{ denotes Gauss notation.}$$

After two-dimensional space filtering processing is completed in step S4 of FIG. 2, affine transformation is performed using two-dimensional affine transformation processor 20. As shown in step S5, in this two-dimensional affine transformation processor 20, the space-filtered image of FIG. 3H is compressed by $\cos\psi$ in a direction indicated by arrow S, i.e., the y-axis direction, thereby forming a compressed image as shown in FIG. 3I as a reprojected image in the reprojecting direction.

Figure 3I:
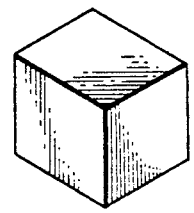

Thus, assuming now that the space-filtered image of FIG. 3H obtained in the step S4 has a coordinate (x,y) before it is compressed in the step S5, and that the compressed image of FIG. 3I obtained in the step S5 has a coordinate (X,Y), the reprojected image of FIG. 3I is obtained in the following equation:

$$\begin{pmatrix} X \\ Y \end{pmatrix} = \begin{pmatrix} 1 & 0 \\ 0 & \sin\psi \end{pmatrix} \begin{pmatrix} x \\ y \end{pmatrix} \quad (5)$$

Data representing the obtained reprojected image RI(X,Y) is supplied to a display (not shown) through a display control circuit (not shown).

According to the described embodiment, it is possible to provide a projected image forming apparatus capable of macroscopically forming a pseudo three-dimensional reprojected image at high speed using two-dimensional image processing means which is simple in construction.

In the described embodiment, two-dimensional image addition, two-dimensional space filtering in the y-axis direction and two-dimensional affine transformation are successively executed in the named order. According to another aspect of the present invention, it is possible to first perform the image rotation and image compression by using a two-dimensional affine transformation and then perform the two-dimensional space filtering in the y-axis direction.

According to the affine transformation of the another aspect of the invention, the added image is rotated through $(90° − \theta)$ and compressed by $\cos\psi$ about the y-axis, the following relation is obtained assuming that the added image formed in step S3 is RI(x,y) and the reprojected image is R(x,y):

$$R(X,Y) = RI(x,y)$$

Reprojected image R(X,Y) is given by the following equation:

$$\begin{pmatrix} X \\ Y \end{pmatrix} = \begin{pmatrix} 1 & 0 \\ 0 & \sin\psi \end{pmatrix} \begin{pmatrix} \cos(90° - \theta) & -\sin(90° - \theta) \\ \sin(90° - \theta) & \cos(90° - \theta) \end{pmatrix} \begin{pmatrix} x \\ y \end{pmatrix} \quad (6)$$

$$= \begin{pmatrix} 1 & 0 \\ 0 & \sin\psi \end{pmatrix} \begin{pmatrix} \sin\theta & -\cos\theta \\ \cos\theta & \sin\theta \end{pmatrix} \begin{pmatrix} x \\ y \end{pmatrix}$$

$$= \begin{pmatrix} \sin\theta & -\cos\theta \\ \sin\psi \cdot \cos\theta & \sin\psi \cdot \sin\theta \end{pmatrix} \begin{pmatrix} x \\ y \end{pmatrix}$$

where (x,y) and (X,Y) are coordinates of points of an image before and after transformation. After the two-dimensional affine transformation at step V of FIG. 8 is completed and after the two-dimensional space filtering is completed, computer 11 outputs the reprojected image formed in accordance with the program to output unit 21 through output controller 20 and displays the image.

Therefore, according to the embodiment having the above arrangement, processor 18 perpendicularly adds tomographic images stored in memory 17 when a reprojecting direction is perpendicular. When a reprojecting direction is oblique, processor 18 calculates offset amounts in x- and y-directions along the reprojecting direction and adds the tomographic images while offsetting the images in accordance with the calculated offset amounts, thereby forming an added image. The added image is rotated through $(90° − \theta)$, space-filtered in the processor 19, and then compressed in the processor 20 to form a three-dimensional reprojected image. Therefore, a pseudo three-dimensional reprojected image can be formed at high speed using the two-dimensional image processing means, and the formed three-dimensional reprojected image is very easy to see and can be easily macroscopically recognized. In addition, the reprojected image is similar to an X-ray perspective image and therefore is familiar and easy to recognize for a human visual sense. Furthermore, when the microscopic features are recognized as described above, the tomographic images can be smoothly analyzed.

According to still another aspect of the present invention, it is possible to first perform the two-dimensional space filtering in both the x-axis and y-axis directions by $\Delta x$ and $\Delta y$ as shown in FIG. 3J. In this case, it is not necessary to perform an image rotation of FIG. 3F by $(90° - \theta)$ and only an image-compression may be performed.

In the above embodiments, processors 18, 19 and 20 are independently used to execute the predetermined processing. However, the same functions may be processed in a software manner using computer 11. In addition, continuous tomographic images are directly transferred to and stored in two-dimensional image memory 17. However, if the tomographic images are temporarily stored in magnetic disk unit 14 and then stored in memory 17, the capacity of memory 17 can be reduced. Furthermore, in the above embodiments, parallel reprojection (in which a viewing angle direction is constant) is performed. However, reprojection with an observing point can be performed by performing two-dimensional affine transformation in consideration of distances from the observing point to the tomographic images and then performing processing similar to that of the above embodiment.

As has been described in detail, according to the above embodiments, there is provided a projected image forming apparatus which can form a microscopic and pseudo three-dimensional reprojected image at high speed using the two-dimensional image processing means.

Figure 4:
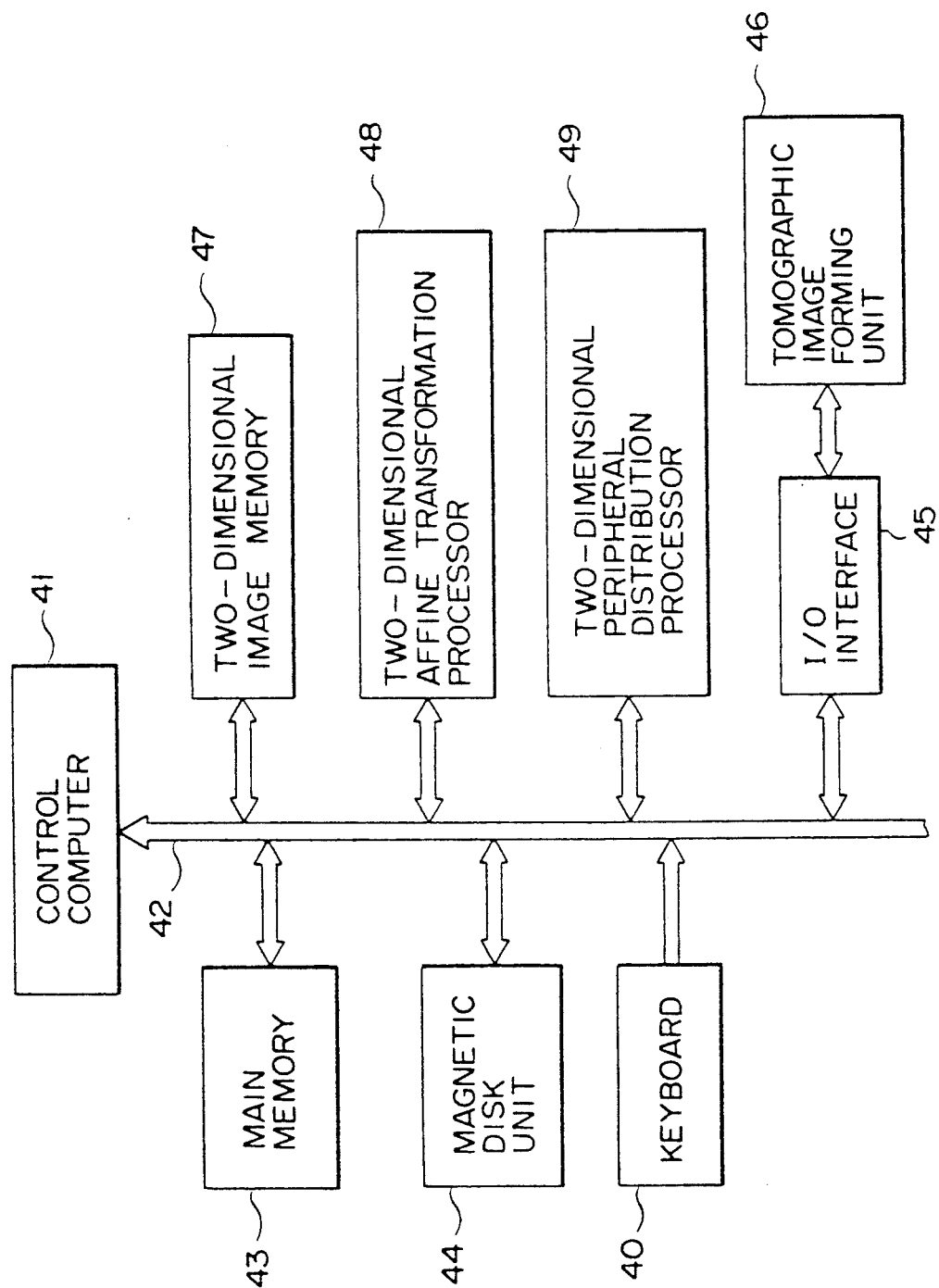
FIG. 4 is a block diagram showing an arrangement of a system according to another embodiment of the present invention.

FIG. 4 is a block diagram showing an arrangement of a system according to another embodiment of the present invention. In FIG. 4, reference numeral 40 denotes a keyboard for key-inputting various parameters for image formation; and 41, a control computer for executing necessary processing in accordance with programs. Bus line 42 of address data and the like having a multibus arrangement extends from computer 41. Line 42 is connected to main memory 43 and magnetic disk unit 44. Memory 43 stores necessary information in accordance with address designation of computer 41. Unit 44 stores programs constituting an operating system of computer 41 and other application programs.

Line 42 is also connected to tomographic image forming unit 46 such as an X-ray CT scanner through I/O interface 45. Unit 46 forms continuous tomographic images (slice images) of an object to be examined and outputs the images to line 42 through interface 45. In addition to the X-ray CT scanner, various apparatuses having a similar function such as an NMR-CT and an ultrasonic tomographic apparatus can be used.

Line 42 is further connected to two-dimensional image memory 47, two-dimensional affine transformation processor 48, and two-dimensional peripheral distribution measurement processor 49. When computer 41 executes a predetermined program, memory 47 sequentially and two-dimensionally stores continuous tomographic image supplied from tomographic image forming unit 16 through interface 15 in a predetermined order and buffers inputs/outputs of processed image data obtained by processors 48 and 49. Two-dimensional affine transformation processor 48 constitutes a two-dimensional affine transformation means including program processing of computer 41 The two-dimensional affine transformation means gives parameters a, b, c, d, e, and f to coordinates (x,y) of an input image and coordinates (x',y') of an output image, thereby performing the following coordinate transformation:

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix}$$

Two-dimensional peripheral distribution measurement processor 49 constitutes a two-dimensional peripheral distribution measuring means including program processing of computer 41. The two-dimensional peripheral distribution measuring means calculates peripheral distribution P(y) of two-dimensional image G(x,y) in accordance with the following equation:

$$P(y) = \sum_{x=0}^{n} G(x, y)$$

where n is the maximum x-coordinate of image G(x,y).

An operation of the above apparatus will be described below with reference to FIG. 5 and FIGS. 6A to 6E. Computer 41 executes an operation of the two-dimensional image memory means in accordance with the program read out from magnetic disk unit 44. As shown in step T1 of FIG. 5, the two-dimensional image memory means supplies 32 continuous tomographic images (256×256 pixels: 256 gray levels) formed by tomographic image forming unit 46 to line 42 through interface 45. Computer 41 reads the supplied tomographic images and sequentially stores the images in memory 47 in a predetermined order, e.g., from the upper left to lower right as shown in FIG. 6A.

In this manner, after the 32 tomographic images are stored in memory 47, processor 48 performs a two-dimensional affine transformation operation in accordance with a command based on a program supplied from computer 41. In this two-dimensional affine transformation, the continuous tomographic images are rotated in a reprojecting direction as shown in step T2. That is, in order to reproject a three-dimensional image of the continuous tomographic images of memory 47 parallelly to the tomographic images, a plurality of continuous tomographic images in memory 47 are processed in consideration of a three-dimensional image as shown in FIG. 6B. Assuming that the image is to be parallelly reprojected in a direction of angle $\theta$ with respect to the x-axis, a direction of arrow P is a reprojecting direction. Therefore, the tomographic images are rotated through $-\theta$ using processor 48, thereby performing coordinate transformation as shown in FIG. 6C. As shown in FIG. 9, processor 48 first fetches data $\theta$ at step W1. Then, the a process shown in step W2 is executed in the following manner. Thus, assuming that coordinates before transformation are (x,y), coordinates (x',y') after transformation are given by the following equation:

$$\begin{pmatrix} x' \\ y' \end{pmatrix} = \begin{pmatrix} \cos\theta & \sin\theta \\ -\sin\theta & \cos\theta \end{pmatrix} \begin{pmatrix} x \\ y \end{pmatrix}$$

When reprojection is parallel, tomographic images are simply rotated. However, when reprojection is to be performed from an observing point, tomographic images are enlarged in consideration of distances from the observing point upon affine transformation of $-\theta°$ rotation. As a result, reprojection with an observing point can be similarly performed.

Thereafter, two-dimensional peripheral distribution processor 49 executes an operation of the two-dimensional peripheral distribution measuring means in accordance with a program command from computer 41. The measuring means calculates peripheral distributions in the x'- and y'-directions using processor 49. That is, in this peripheral distribution measurement, an integral value distribution of gray levels of tomographic images in the x'- and y'-directions is calculated as shown in step T3. For example, considering only the x'-direction, peripheral distribution P(y) is calculated as shown in FIG. 6D. That is, the following equation is obtained to be executed in step W3 in FIG. 9:

$$P(y) = \sum_{x=0}^{n} G(x,y) \quad P(x) = \sum_{y=0}^{n} G(x,y)$$

Peripheral distribution data thus obtained is stored in an output-only memory (not shown) or two-dimensional image memory 47.

Figure 5:
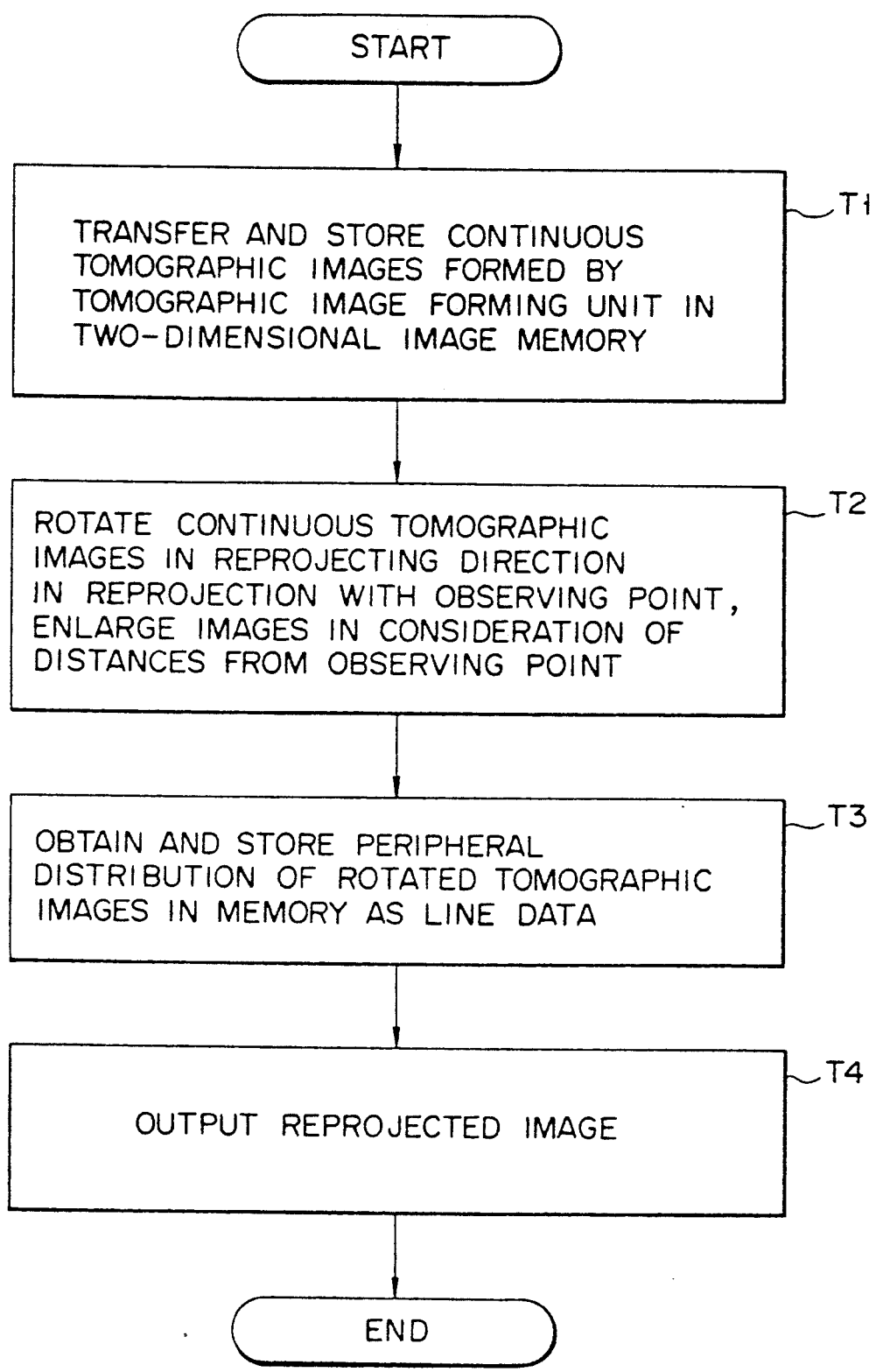
FIG. 5 is a flow chart for explaining an operation of the embodiment shown in FIG. 4.

When peripheral distribution data is obtained as described above, line data of the peripheral distribution data of the tomographic images are aligned in the z-direction as shown in FIG. 6E and output, as shown in step T4 of FIG. 5 and step W4 of FIG. 9. As a result, a three-dimensional reprojected image can be output to a display (not shown). Reprojected image R(y,z) can be given by the following equation:

$$R(y,z) = P(y,z)$$

As described above, after the tomographic images formed by tomographic image forming unit 46 are sequentially stored in two-dimensional image memory 47, the tomographic images are rotated in a reprojecting direction using two-dimensional affine transformation processor 48. Thereafter, peripheral distributions in the x- and y-directions of the tomographic images after affine transformation are obtained, and peripheral distribution data are aligned in the z-direction as line data and output. As a result, a three-dimensional reprojected image in a direction parallel to a slice direction can be output. In addition, since images can be two-dimensionally processed by internal units without using external units, image processing can be performed at high speed, and the entire apparatus can be made compact.

Although affine transformation is performed in the above embodiment, it need not be performed if $\theta = 0$. In addition, two-dimensional affine transformation and two-dimensional peripheral distribution measurement are performed using processors 48 and 49 for these purposes only. However, these transformation and measurement can be processed by computer 41 having a larger processing capacity in a software manner.

As has been described in detail, according to the above embodiment, a three-dimensional reprojected image can be formed at high speed using the two-dimensional image processing means, and overall features can be macroscopically recognized by displaying the three-dimensional reprojected image. Therefore, if analysis of the tomographic images is necessary, efficiency of the analysis can be increased. In addition, by displaying a pseudo three-dimensional reprojected image using the two-dimensional image processing means, an image similar to a perspective image can be formed. Therefore, there is provided a projected image forming apparatus which can form a reprojected image which is easy to see.

What is claimed is:

1. An image information processing apparatus comprising:
   tomographic image forming unit for forming continuous tomographic image data;
   two-dimensional image memory means for storing the continuous tomographic image data formed by said tomographic image forming unit;
   two-dimensional image adding means for adding the continuous tomographic image data in an image reprojection direction while offsetting the tomographic images stored in the two-dimensional image memory means;
   two-dimensional space filtering means for performing space filtering of spaces between the continuous tomographic image data added by said two-dimensional image adding means to interpolate the spaces; and
   two-dimensional affine transforming means for performing two-dimensional affine transformation of an interpolated image obtained in said two-dimensional space filtering means to obtain a compressed reprojected image;
   wherein said two-dimensional image adding means include:
   means for judging whether an indicated reprojecting direction is perpendicular to a slice plane of the tomographic image; and
   means for adding values at corresponding addresses of all successive tomographic images stored in said image memory means.

2. The apparatus according to claim 1, wherein said two-dimensional image adding means include:
   means for calculating offset amounts of projected points on the tomographic images in accordance with an angle defined between a projecting direction and the tomographic images;
   means for obtaining corresponding pixel points on the tomographic images in accordance with the offset amounts; and
   means for adding pixel values at the pixel points.

3. The apparatus according to claim 2, wherein said offset amounts calculating means include means for calculating offset amounts $(\Delta x, \Delta y)$ of the projected points:

$$\Delta x = (D/\tan\psi)\cos\theta$$

$$\Delta y = (D/\tan\psi)\sin\theta$$

where D denotes a distance between two adjacent tomographic images, $\psi$ denotes an angle defined between the reprojecting direction and an tomographic image plane and $\theta$ denotes an angle defined between the reprojection direction on the tomographic image plane and x axis;

means for executing calculation of:

$$RI(x, y) = \sum_{k=0}^{m} Gk(x + k\Delta x, y + k\Delta y), \text{ where } RI$$

denotes an image obtained after addition, m denotes number of tomographic images to be added and Gk denotes a Kth tomographic image; and means for executing two-dimensional affine transformation to obtain a reprojection image R(X,Y);

$$\begin{pmatrix} X \\ Y \end{pmatrix} = \begin{pmatrix} 1 & 0 \\ 0 & \sin\psi \end{pmatrix} \begin{pmatrix} \cos(90° - \theta) & -\sin(90° - \theta) \\ \sin(90° - \theta) & \cos(90° - \theta) \end{pmatrix} \begin{pmatrix} x \\ y \end{pmatrix}$$

$$= \begin{pmatrix} 1 & 0 \\ 0 & \sin\psi \end{pmatrix} \begin{pmatrix} \sin\theta & -\cos\theta \\ \cos\theta & \sin\theta \end{pmatrix} \begin{pmatrix} x \\ y \end{pmatrix}$$

4. An image information processing apparatus comprising:

a control computer means for controlling an operation of the image information processing apparatus;

a system bus connected to the control computer means;

tomographic image forming unit connected to the system bus for forming continuous tomographic images data;

two-dimensional image memory means connected to the system bus for storing the continuous tomographic images data formed by said tomographic image forming unit;

two-dimensional image adding processor connected to said system bus for adding the continuous tomographic images data in an image reprojection direction while offsetting the tomographic images stored in the two-dimensional image memory means under control of said control computer means;

two-dimensional space filtering processor connected to said system bus for performing space filtering of dataless spaces between the continuous tomographic images added by said two-dimensional image adding processor to interpolate the spaces under control of said control computer means; and two-dimensional affine transforming processor connected to said system bus for performing two-dimensional affine transformation of an interpolated image obtained in said two-dimensional space filtering processor to obtain a compressed reprojected image.

* * * * *